April 8, 1947.  O. W. RICHARDS  2,418,602
VARIABLE FIELD MICROSCOPE
Filed Nov. 13, 1943  2 Sheets-Sheet 1
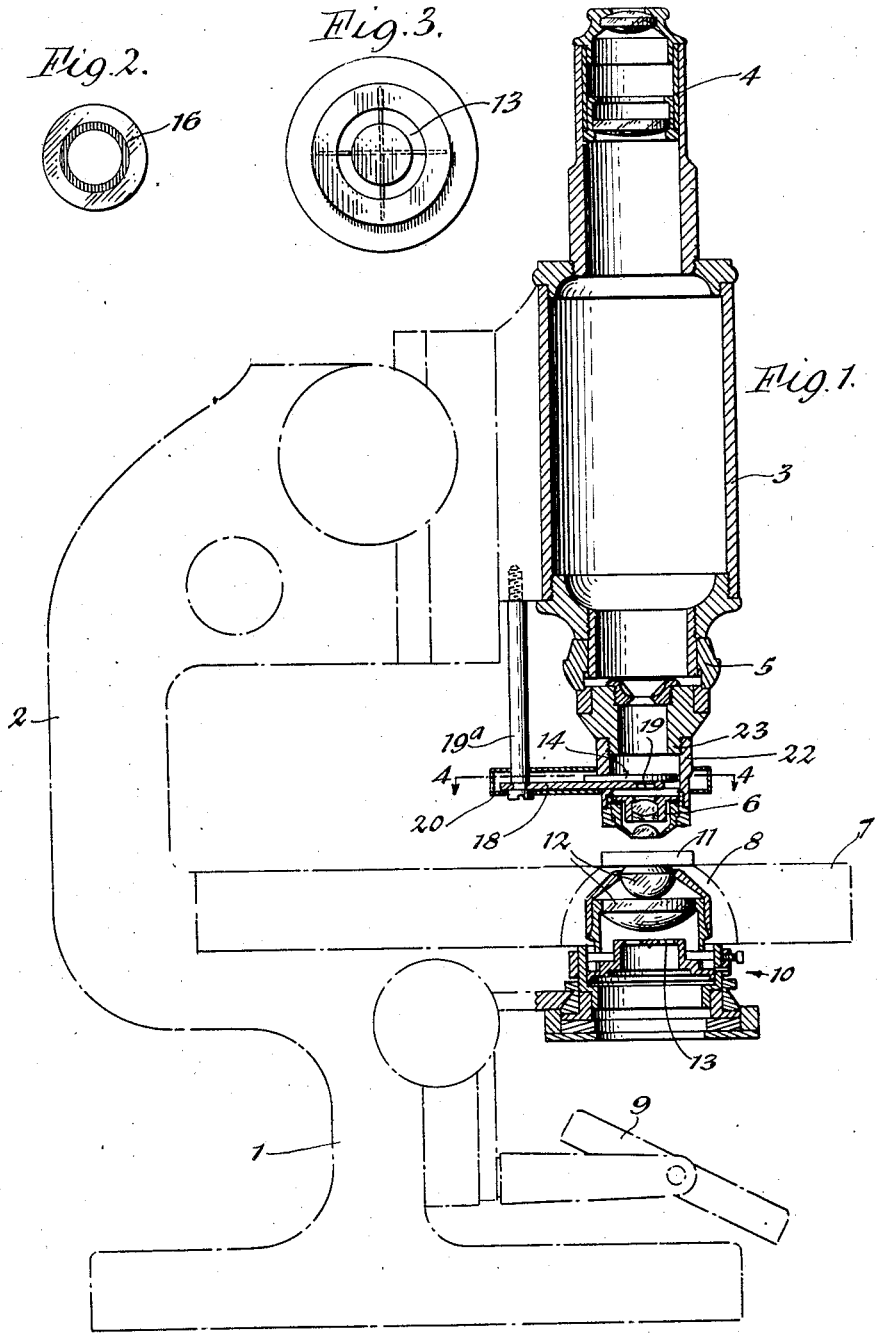
INVENTOR.
OSCAR W. RICHARDS
BY
ATTORNEY

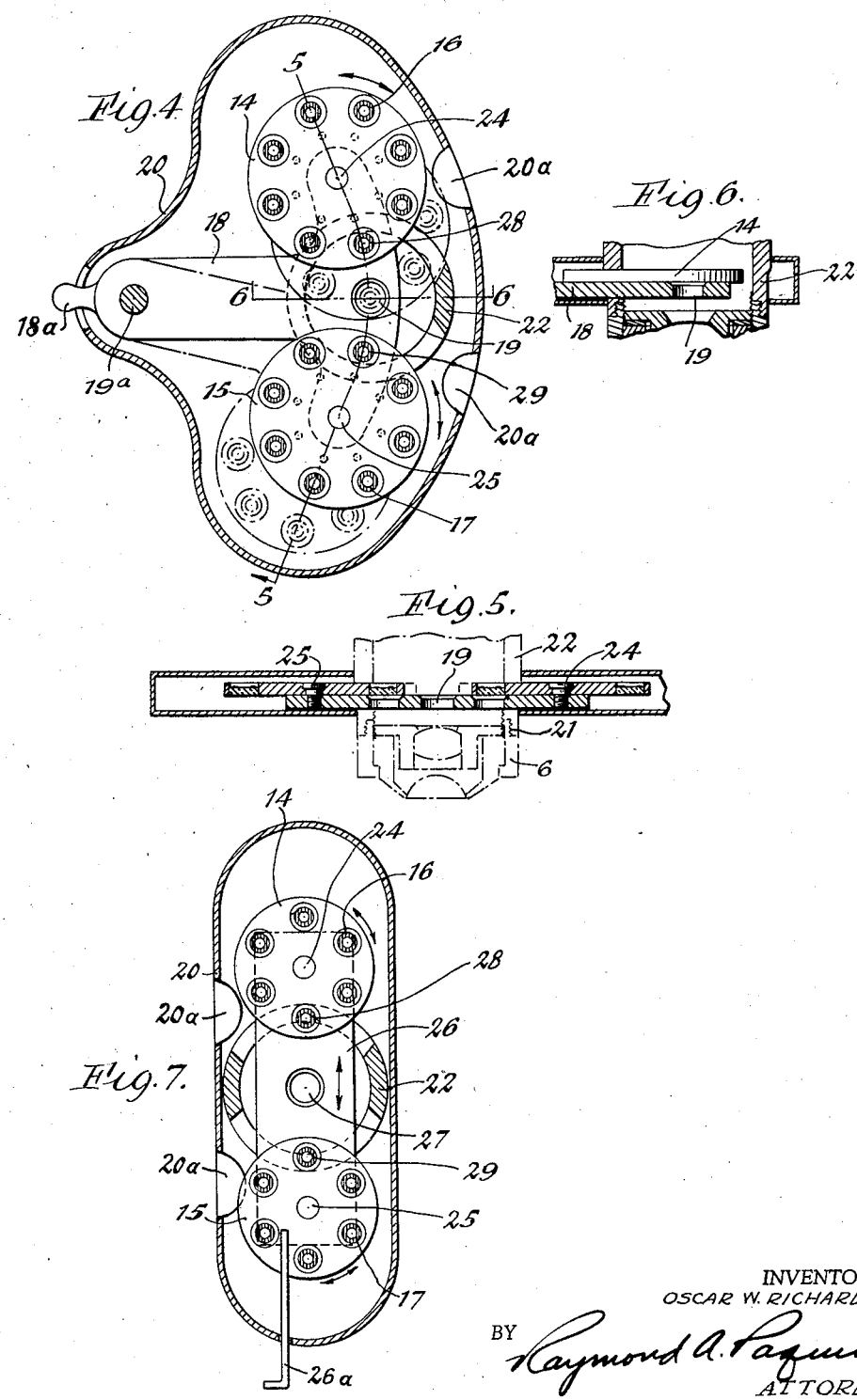

Patented Apr. 8, 1947

2,418,602

UNITED STATES PATENT OFFICE 2,418,602

VARIABLE FIELD MICROSCOPE

Oscar W. Richards, Snyder, N. Y., assignor, by mesne assignments, to American Optical Company, Southbridge, Mass., a voluntary association Application November 13, 1943, Serial No. 510,090

3 Claims. (Cl. 88—39)

This invention relates to new and useful improvements in microscopes or the like and has particular reference for simply and quickly changing the contrast between portions of the field viewed through the microscope.

An object of the invention is to provide new and improved means whereby the contrast between portions of the field of view through a microscope may be easily and quickly changed to allow the viewing of the field under such different contrast.

Another object of the invention is to provide new and improved means for interchangeably supporting a plurality of light altering members in conjunction with a microscope whereby a desired member may be rapidly aligned with the optical system of the microscope.

Another object of the invention is to provide a carrier for supporting a plurality of series of light altering members relative to a microscope whereby any desired member of either series may be easily and quickly aligned with the optical system of the microscope.

Other objects and advantages of the invention will be apparent from the following description taken in connection with the accompanying drawings. It will be understood that many changes may be made in the details of construction and arrangement of parts without departing from the spirit of the invention as expressed in the accompanying claims. I, therefore, do not wish to be limited to the exact details of construction and arrangement of parts shown and described as the preferred form has been given by way of illustration only.

Referring to the drawings:

Fig. 1 is a side view, partly in section, of a microscope embodying the invention;

Fig. 2 is a top or plan view of one light altering disc;

Fig. 3 is a sectional view showing part of the condenser arrangement;

Fig. 4 is a section on line 4—4 of Fig. 1 showing one form of the invention;

Fig. 5 is a sectional view taken on line 5—5 of Fig. 4;

Fig. 6 is a sectional view taken on line 6—6 of Fig. 4; and

Fig. 7 is a view similar to Fig. 4 but showing a modified form of the invention.

In the application of Osterberg et al., Serial Number 456,726, filed August 28, 1942, is disclosed an arrangement for viewing objects through the microscope under what is called a "phase contrast" technique. This method as disclosed in said Osterberg application involves the use of a series of discs, each having different light altering properties with means for quickly and easily interposing any desired member of the series in proper position in the path of light through the microscope whereby the contrast between different parts of the field is altered, the type of change depending upon the particular characteristics of the specimen under view and the disc of the series interposed in the light path.

The series may contain numerous discs each having different light altering characteristics or the series may be composed of two different kinds of discs, such as for example, one set which allows the specimen to be seen as light on a dark background and the other set which allows the specimen to be seen dark on a light background. Each of these types of discs have certain advantages for the observation of different specimens or different parts of a single specimen and in this case it is desirable that means be provided whereby each disc of a set may be rapidly interposed in the light path of a microscope and then the best disc of each series or set be easily and rapidly interchanged to allow observation of the specimen or parts thereof, successively at will. It is, therefore, an object of the present invention to provide means whereby each disc of a set may be rapidly aligned with the optical path of a microscope and whereby a desired disc from each series or set may be rapidly and easily interposed, alternately, in the light path of the viewing instrument.

Referring more particularly to the drawings wherein similar reference characters designate corresponding parts throughout the several views, the microscope shown in conjunction with the invention in Fig. 1 comprises a base 1 supporting the upright arm 2 which carries the microscope body tube 3. This body tube 3 supports the eyepiece 4, nosepiece 5 and objective 6.

On the base 1 is positioned the stage 7 having the opening 8 therethrough whereby light from the mirror or reflector 9 may pass through the condenser arrangement 10 and specimen or slide 11 to the objective 6 and thus to the eyepiece 4 through which eyepiece the specimen on slide 11 may be observed.

The condenser arrangement 10 as described in the Osterberg et al. application mentioned above contains the usual condensing lenses 12 and also contains the circular aperture or diaphragm 13 as shown in Fig. 3. This condenser arrangement is adapted to co-operatively function with the disc which is in the light path of the microscope to increase the contrast between the specimen and the background or between different portions of the specimen as set forth above.

In the arrangement shown there are two rotatable mounts 14 and 15 each containing a series of discs 16 and 17 respectively. These rotatable mounts 14 and 15 are mounted on a pivotal carrier 18 which is pivotally carried by the arm 19a which is connected to the support for the body tube of the microscope. Adjacent the center of the carrier 18 is an intermediate opening or aperture 19 adapted to be aligned with the optical path of the microscope when it is not desired to employ either of the series of discs 16 or 17.

Surrounding the mounts 14 and 15 and carrier 18 is the cover 20 which excludes light and dust etc. from the discs and also from the interior of the objective 6 which is threadedly connected at 21 to the lower end of the tubular member 22 which is threadedly secured to the nosepiece at 23 and which allows the interchanging of objectives without interfering with the discs 14 and 15.

The discs 14 and 15 are rotatably mounted at 24 and 25 to two oppositely extending arms of the carrier 18.

In the form of the invention shown in Fig. 7 the carrier 26 extends through slots in the carrier 22 and the support 26 has the intermediate opening 27 for alignment with the optical path of the instrument in a manner similar to the opening 19 in the carrier 18. In this form the rotatable mounts 14 and 15 are pivotally secured to the carrier 26 at 24 and 25 respectively as previously described.

It will be seen that by employing the construction of this application that it is possible for the observer to use the microscope without employing either series of discs and also that by merely pivoting the carrier 18 or sliding the carrier 26 he can align a particular series with the optical path of the instrument and then by rotating the rotatable mount can successively observe the image through each of the discs of that series until the desired contrast is obtained and then by pivoting or sliding the other series of discs into alignment with the optical path he can ascertain the disc of that particular series which gives the desired or best contrast and then these best discs 28 and 29 may be easily and quickly interchanged in the light path of the instrument by either pivoting the carrier 18 on the pivot 19a or sliding the carrier 26 in the form shown in Fig. 7 so that the specimen may be viewed alternately through each of said best discs of their respective series quickly and without loss of time and without interferring with the optical set up of the instrument nor disturbing the specimen.

The handle 18a on the carrier 18 allows the pivoting of said carrier 18 and the mounts 14 and 15 into and out of operative position and the cut out portions 20a in the cover 20 allows the rotating of the mount 14 or 15 which is in use.

In the form shown in Fig. 7 the handle 26a allows the shifting of the mounts 14 and 15 and the cut out portions 20a allow the rotation of the said mounts to align the desired light altering member with the light path of the microscope.

From the foregoing it will be seen that I have provided simple, efficient and economical means for obtaining all of the objects and advantages of the invention.

Having described my invention, I claim:

1. In a microscope having a condenser with a predetermined aperture controlling the cross section of the beam of light illuminating the object to be observed and an objective for forming an image of said object, means for modifying the image thus formed so as to be seen selectively as light on a dark background or dark on a light background comprising a movable carrier, and a pair of mounts each swivelled on said carrier, one of said mounts being provided with a series of optical members for producing various amounts of contrast in said image with the object seen as light on a dark background, the other of said mounts being provided with a different series of optical members for producing various amounts of contrast in said image with the object seen as dark on a light background, movement of said carrier in one direction bringing one of said mounts into operative relation to said condenser and objective and movement thereof in the opposite direction bringing the other of said mounts into operative relation to said condenser and objective, each mount being adjustable by swivelling on said carrier to bring a selected optical member into alignment with the optic axis of said objective.

2. In a microscope, the combination with a microscope objective, a slotted tubular support for the microscope objective and a condenser with a predetermined aperture controlling the cross section of the beam of light illuminating the object to be observed, of means for modifying the image formed by said objective comprising a carrier movable relative to said slot, and a pair of mounts each swivelled on said carrier, one of said mounts being provided with a series of optical members for producing various amounts of contrast in said image with the object seen as light on a dark background, and the other of said mounts being provided with a different series of optical members for producing various amounts of contrast in said image with the object seen as dark on a light background, one of said mounts being inserted in said slotted tubular support when said carrier is moved relative thereto in one direction and the other mount being substituted therefor in said slotted support when said carrier is moved in the other direction, each mount being adjustable by swivelling to bring a selected optical member into alignment with the optic axis of the microscope objective.

3. In a microscope, the combination according to claim 2 together with a cover for housing said mounts and protecting said optical members and slotted support from dust, said cover being provided with finger openings in operative relation to said mounts to permit adjustment of said mounts to bring a selected optical member into alignment with the optic axis of the microscope objective.

OSCAR W. RICHARDS.

REFERENCES CITED

The following references are of record in the file of this patent:

UNITED STATES PATENTS

| Number | Name | Date |
| --- | --- | --- |
| 2,009,145 | Nathan | July 23, 1935 |
| 1,385,696 | Marshall | July 26, 1921 |
| 2,078,181 | Land | Apr. 20, 1937 |
| 182,919 | Gundlach | Oct. 3, 1876 |
| 1,544,973 | Ghadiali | July 7, 1925 |
| 2,152,513 | West | Mar. 28, 1939 |
| 2,151,735 | Bresser | Mar. 28, 1939 |
| 1,626,841 | Kelley | May 3, 1927 |
| 561,132 | Roche | June 2, 1896 |
| 2,105,671 | Roesch | Jan. 18, 1938 |
| 2,205,179 | Schultz | June 18, 1940 |
| 513,912 | Gardam | Jan. 30, 1894 |

FOREIGN PATENTS

| Number | Country | Date |
| --- | --- | --- |
| 12,512 | British | May 30, 1907 |